(12) United States Patent
Nelle

(10) Patent No.: US 11,738,303 B2
(45) Date of Patent: Aug. 29, 2023

(54) FUEL GAS CONDITIONING SYSTEM AND METHOD

(71) Applicant: Estis Compression, LLC, Kilgore, TX (US)

(72) Inventor: Will Nelle, San Angelo, TX (US)

(73) Assignee: ESTIS COMPRESSION, LLC, Kilgore, TX (US)

( * ) Notice: Subject to any disclaimer, the term of this patent is extended or adjusted under 35 U.S.C. 154(b) by 259 days.

(21) Appl. No.: 17/202,009

(22) Filed: Mar. 15, 2021

(65) Prior Publication Data

US 2022/0288528 A1    Sep. 15, 2022

(51) Int. Cl.
| | |
|---|---|
| B01D 53/18 | (2006.01) |
| F28D 7/10 | (2006.01) |
| F28F 1/10 | (2006.01) |
| F28F 1/40 | (2006.01) |
| F28F 1/00 | (2006.01) |
| B01D 46/00 | (2022.01) |

(52) U.S. Cl.
CPC ......... B01D 53/18 (2013.01); B01D 46/0031 (2013.01); F28F 1/003 (2013.01); F28F 1/405 (2013.01)

(58) Field of Classification Search
None
See application file for complete search history.

(56) References Cited

U.S. PATENT DOCUMENTS

| | | |
|---|---|---|
| 9,527,786 B1 | 12/2016 | Heath |
| 2010/0232985 A1 | 9/2010 | Jensvold |
| 2014/0318634 A1* | 10/2014 | Zhang ............... F16K 5/06 137/12 |
| 2021/0148344 A1 | 5/2021 | Elmer, Jr. |
| 2022/0219111 A1* | 7/2022 | Cebull .............. C10L 3/101 |

OTHER PUBLICATIONS

"Gas Purificaton Techniques", (LENNTECH) Sep. 20, 2019 (Sep. 20, 2019) [online] retrieved from <URL: https://web.archive.org/web/20190920123951/https://www.lenntech.com/air-purification/gas-purification-techniques/gasscrubber.htm>.
"Basic Operation of Three Phase Separators" (NONIRON) Aug. 15, 2017 (Aug. 15, 2017) [online] retrieved from URL: https://www.honiron.com/basic-operation-three-phase-separators/>.

* cited by examiner

*Primary Examiner* — Philip Y Louie
(74) *Attorney, Agent, or Firm* — FisherBroyles, LLP; Jason P. Mueller

(57) ABSTRACT

Systems and methods are disclosed for conditioning a fuel gas for a gas engine of a multi-stage gas compressor. The system includes a scrubber of the gas compressor, a heat exchanger, a pressure reducing valve, and a pressure vessel. A disclosed method includes causing a stream of gas to flow from the scrubber of the gas compressor to the heat exchanger, adding heat to the gas via the heat exchanger, lowering the pressure of the gas via the pressure reducing valve, providing the gas to the pressure vessel, removing liquids from the gas via a coalescing type filter element of the pressure vessel, and providing the conditioned fuel gas from the pressure vessel to the engine of the gas compressor. The gas is taken downstream from a mist extraction device of the scrubber and the scrubber is part of a last stage of compression in the multi-stage gas compressor.

20 Claims, 9 Drawing Sheets

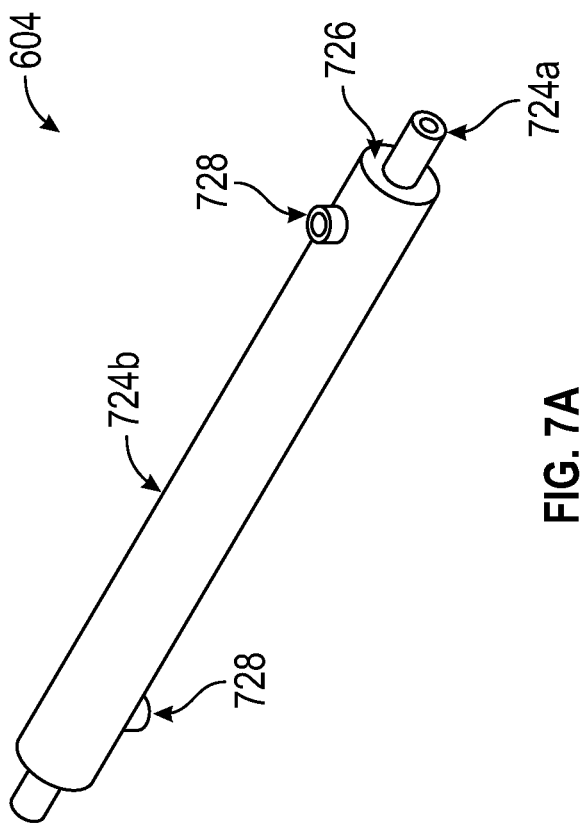
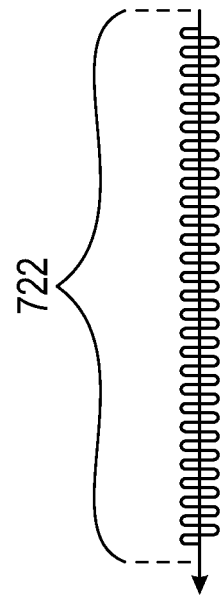
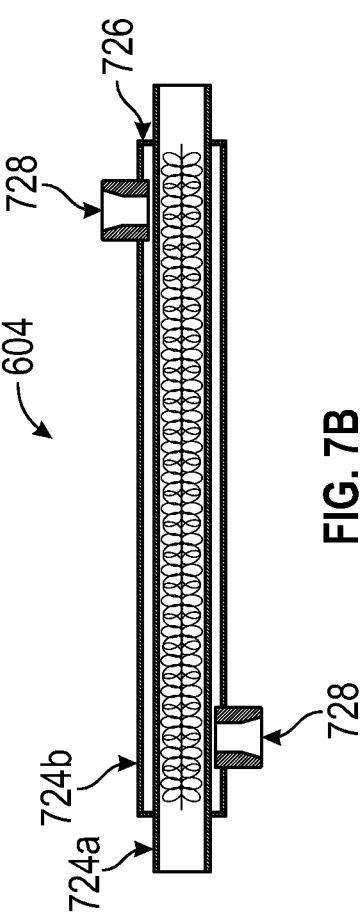
FIG. 7A
FIG. 7B
FIG. 7C

FUEL GAS CONDITIONING SYSTEM AND METHOD

BRIEF DESCRIPTION OF THE DRAWINGS

The accompanying drawings are part of this disclosure and are incorporated into the specification. The drawings illustrate example embodiments of the disclosure and, in conjunction with the description and claims, serve to explain various principles, features, or aspects of the disclosure. Certain embodiments of the disclosure are described more fully below with reference to the accompanying drawings. However, various aspects of the disclosure may be implemented in many different forms and should not be construed as being limited to the implementations set forth herein. Like numbers refer to like, but not necessarily the same or identical, elements throughout.

FIG. 7A illustrates an example heat exchanger which is a component of the fuel gas conditioning system of FIG. 6, according to an embodiment.

FIG. 7B illustrates a cross-sectional view of the heat exchanger of FIG. 7A, according to an embodiment.

FIG. 7C illustrates a matrix heat transfer element, which is a component of the heat exchanger of FIGS. 7B and 7C.

DETAILED DESCRIPTION

Figure 1:
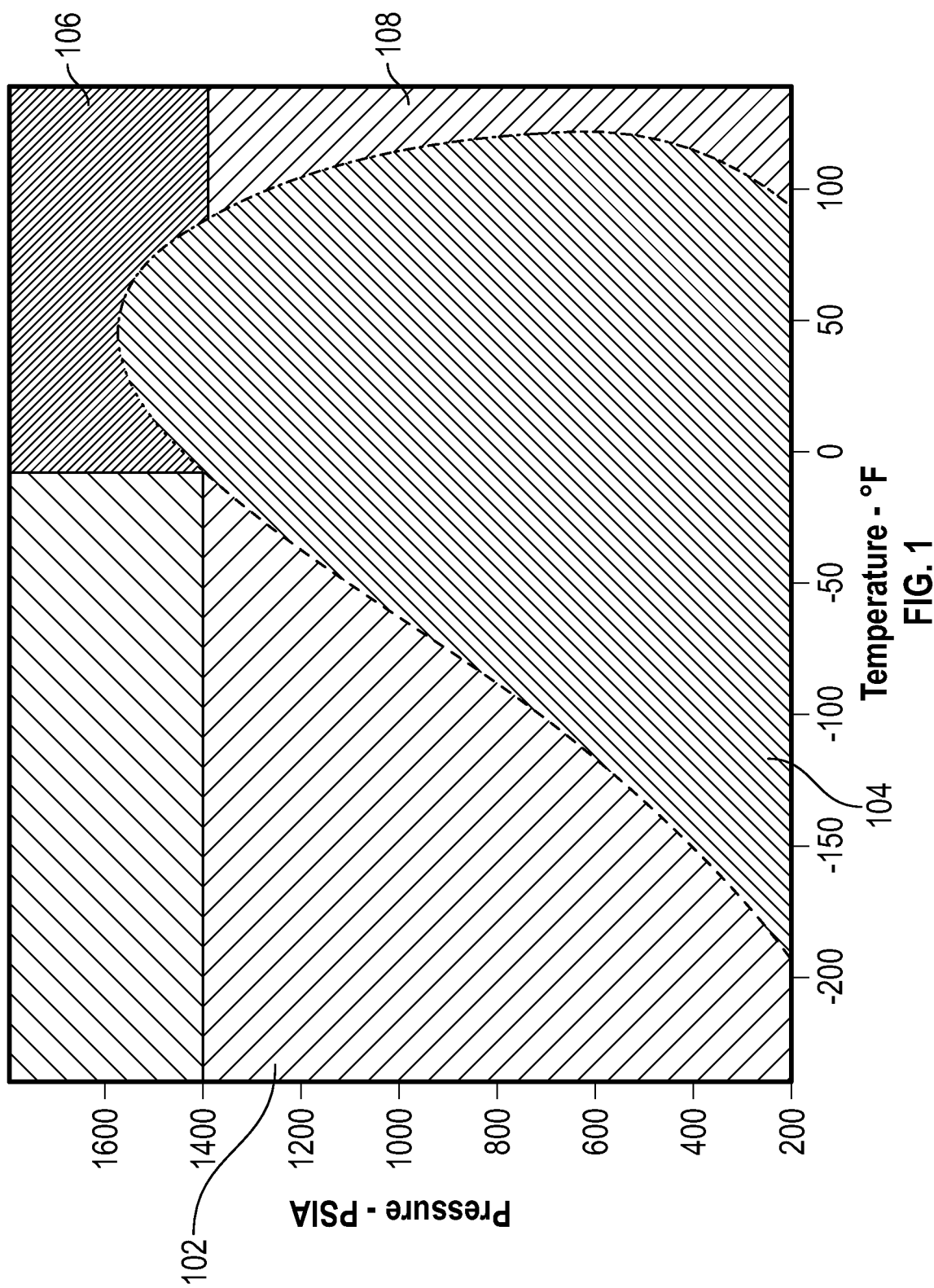
FIG. 1 shows the pressure-temperature phase diagram of natural gas relevant to the compressor technology of this disclosure, according to various embodiments.

This disclosure generally relates to gas compressor systems that are powered by natural gas engines. Such systems may be used in the oil/gas industry to generate pressurized gas required for gas lift applications. Disclosed embodiments may further include a gas conditioning system that takes wellhead natural gas and conditions the gas to generate a fuel gas that may be used by the natural gas engine that powers the gas compressor system.

Wellbores drilled for the production of oil and gas often produce fluids in both the gas and liquid phases. Produced liquid phase fluids may include hydrocarbon oils, natural gas condensate, and water. When a well is first completed, the initial formation pressure is typically sufficient to force liquids up the wellbore and to the surface along with the produced gas. However, during the life of a well, the natural formation pressure tends to decrease as fluids are removed from the formation. As this downhole pressure decreases over time, the velocity of gases moving upward through the wellbore also decreases, thereby resulting in a steep production decline of liquid phase fluids from the well. Additionally, the hydrostatic head of fluids in the wellbore may significantly impede the flow of gas phase fluids into the wellbore from the formation, further reducing production. The result is that a well may lose its ability to naturally produce fluids in commercially viable quantities over the course of the life of the well.

Various artificial lift methods have been developed to increase production from such a well. One such artificial lift method is gas lift. In gas lift methods, a gas is injected into the wellbore downhole to lighten, or reduce the density of, the fluid column by introducing gas bubbles into the column. A lighter fluid column results in a lower bottom-hole pressure, which increases fluid production rates from the well. Gas lift is a method that is very tolerant of particulate-laden fluids and is also effective on higher gas oil ratio (GOR) wells. As such, gas lift has become a commonly utilized artificial lift method in shale oil and gas wells.

Gas lift was initially introduced in the early part of the $20^{th}$ century. With the advent of the horizontal oil shale boom in recent years, gas lift methods have enjoyed a resurgence in popularity. This is due, in part, to the ability of gas lift methods to handle solids such as frac sand, and because deviated wellbores do not impose challenges as they do with rod lift or electric submersible lift. In addition, producing bottom-hole pressures achieved with gas lift can often be below those obtained with these other forms of lift, which may be a benefit to oil and gas operators. These other forms of lift are also susceptible to problems created by gas interference. This gas interference, caused by lighter hydrocarbons vaporizing when exposed to lower pressures, only serves to increase the efficacy of gas lift.

In conventional gas lift methods, a gas lift compressor at the surface injects gas through multiple gas lift valves positioned vertically along the production tubing string. Conventional gas lift compressors typically have a discharge pressure in a range of 1,000 psig to 1,200 psig. However, there are disadvantages in conventional gas lift compressor systems. For instance, the fluid lift rates achievable by conventional gas lift compressors are typically limited, which limits the effectiveness of gas lift operations. Although conventional gas lift compressors may achieve higher lift rates than some other artificial lift methods, such as rod pumping, gas lift typically does not produce the same lift rates of other methods such as electric submersible pumps (ESPs).

To overcome limited fluid lift rates, the use of High Pressure Gas Lift (HPGL) compressors has gained traction in the oil and gas industry in recent years. Typical systems include a HPGL booster compressors coupled with conventional gas lift compressors. The HPGL process is a variation on conventional gas lift methods in which no gas lift valves are required in the production tubing string. Instead, compressed gas is injected into the wellbore fluid column near the end of tubing (EOT), thereby reducing the density of the entire fluid column, which provides higher production rates as compared to conventional gas lift methods. Like conventional gas lift, HPGL is tolerant of particulate-laden fluids and high GORs and typically provides fluid lift rates comparable to ESPs. However, the HPGL gas lift process requires a source of compressed gas at a significantly higher pressure than the compressed gas utilized in conventional gas lift processes. HPGL gas lift compressors are typically designed to produce compressed gas at a discharge pressure of up to 4,000 psig in order to provide an adequate injection gas flow rate.

In the first half of the $20^{th}$ century, compressor technology consisted mainly of large central compressor stations. Often, gas processing was associated with these compressor stations. The gas processing stripped propane, butane, hexane, and other components known as natural gas liquids (NGL) from the gas prior to reinjection. Among other things, such hydrocarbon removal aided in the reliable operation of gas lift distribution systems by lessening the likelihood of problems such as liquid condensation and hydrate formation.

Compressor technology changed in the mid-20$^{th}$ century with the advent of separable and high-speed engines, along with separable compressor frames having reduced footprints. The large banks of compressor buildings, of conventional systems, were replaced by smaller distributed compressor stations, with individual compressors. The smaller distributed compressor stations are more susceptible to hydrocarbon condensation and hydrate formation because of the lack of gas plants to remove such hydrocarbons.

With the introduction of these smaller distributed compressors, oil and gas operators are more commonly installing compressors for gas lift service at either the wellsite or at centralized tank batteries that serve multiple wells. This centralized compression practice is a holdover from the 1950's, but is still popular among operators who believe that centralized compression with fewer larger compressors is more cost effective than multiple smaller wellsite compressors. While it is true that the larger compressors have a lower cost per unit of horsepower, the centralized compression model requires an expensive 1000 psig gas distribution system. These piping systems tend to allow the injection gas to cool to ambient earth temperature, which results in substantial hydrocarbon condensation and/or hydrate problems since the NGL's have not been removed by a gas plant.

Some recent HPGL systems were deployed in horizontal unconventional wells using a booster compressor to boost pressures obtained by a conventional gas lift compressor (i.e., pressures on the order of 1000 psig) up to pressures on the order of 4000 psig as needed for HPGL. In such deployments, the HPGL compressor may not be needed after several months of production. This is because the required injection pressure generally declines over time to a value that may be generated without the use of the HPGL compressor. However, in certain situations it may become necessary to re-introduce the HPGL compressor, for example, when well productivity decreases substantially due to the occurrence of a "frac hit."

A frac hit is an inter-well communication event where an offset well, often termed a parent well, is affected by the pumping of a hydraulic fracturing treatment in a new well, called the child well. Gas lift, being least impacted by frac hits in comparison to beam lift or ESPs, has grown in favor partly due to this observation. However, another result of a frac hit is that the well productivity may change dramatically as a result of the frac hit. Where it may have had a very low flowing bottom hole pressure, say only 500 psig, it may change to a 2000 psig pressure with a multi-fold increase in liquid production after the frac hit than prior to the frac hit. When using HPGL, injection pressures and rates must be changed accordingly. HPGL compressors are very adaptable and changing injection pressures and rates required by frac hits is readily accomplished.

Design parameters for the distributed and individual compressors as are used in conventional gas lift and HPGL systems must be different from those of a conventional gas sales compressor. Variables such as hydrocarbon condensation issues, and hydrate formation must be considered. There is a long felt need for a stand-alone compressor package, specifically for HPGL applications, where pressures fluctuate greatly and the feed gas is unprocessed and contains produced water and is rich with heavier hydrocarbon molecules. Disclosed embodiments provide a specialized gas compressor that is designed to meet the needs of single point HPGL as well as conventional gas lift. The various parameters impacting compressor design are described below, including hydrocarbon condensation issues and hydrate formation.

Hydrocarbon condensation refers to a process in which hydrocarbons change phase, from gas to liquid. This phase change occurs when the pressure and temperature of the hydrocarbon is not controlled such that the hydrocarbon is kept in the vapor phase region as is shown in 108 of FIG. 1. Heavier hydrocarbons condense at higher temperatures and are thus more difficult to maintain in vapor phase.

When gas lift is used for an oil well application, the quantity of NGL's having high gas gravity are normally far greater than found in gas sales applications. When these NGL components go through the compression cycle, they often condense and even freeze (i.e., form hydrates) when passing through pressure regulators that are common in the fuel gas systems for the engines which power the compressor packages. This results in multiple operating problems to the compression process, and leads to additional expense, additional downtime, and environmentally un-friendly practices.

FIG. 1 shows the pressure-temperature phase diagram of natural gas relevant to the compressor technology of this disclosure, according to an embodiment. As shown, the phase diagram includes a liquid region 102, a two-phase region 104, a supercritical fluid region 106, and a vapor phase region 108. Condensation of NGLs may be avoided by controlling the pressure and temperature to keep the gas in the vapor phase 108.

Figure 2:
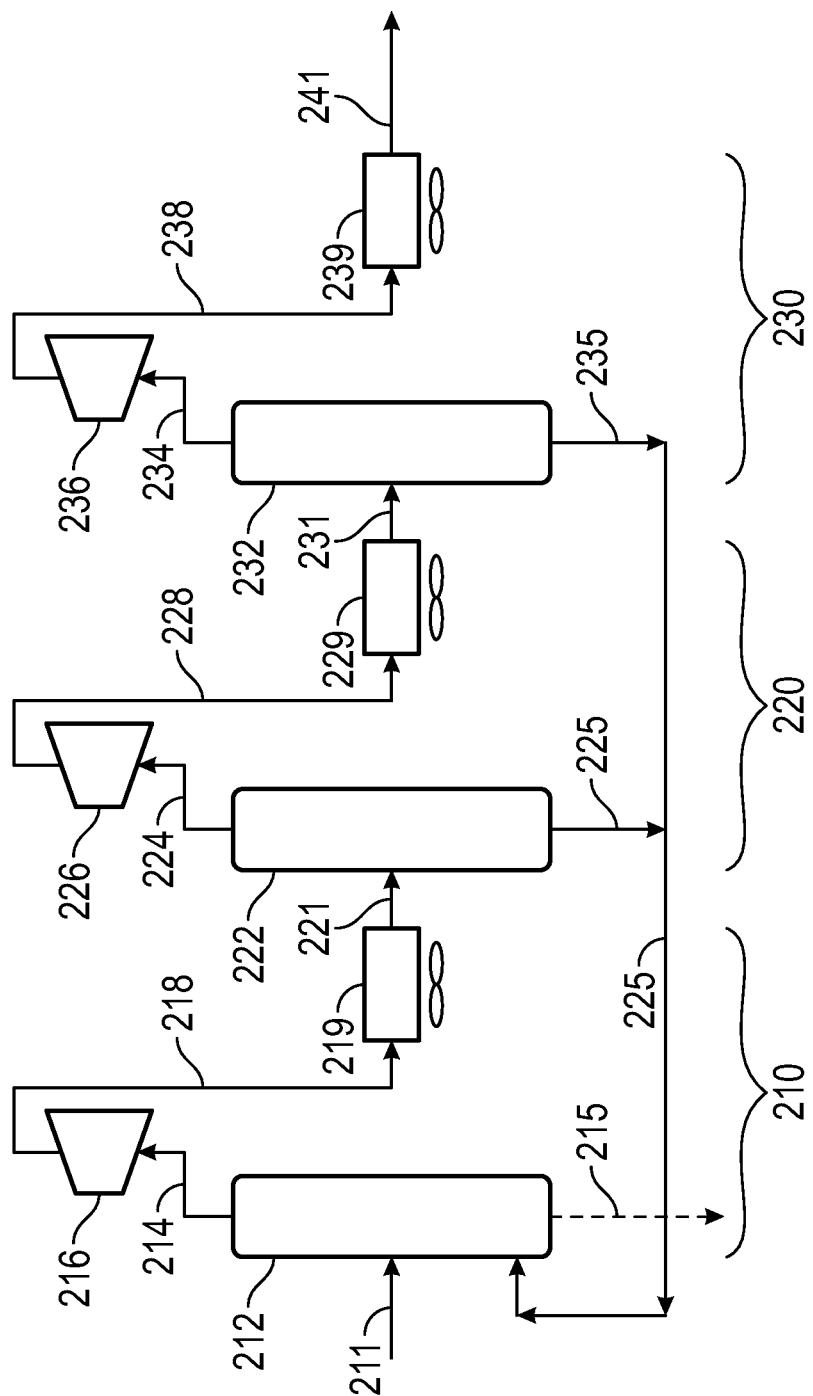
FIG. 2 illustrates a three-stage compressor cycle design, according to an embodiment.

FIG. 2 illustrates a three stage compressor cycle design, according to an embodiment. As shown in FIG. 2, there is a cooling process that occurs after each stage of compression. Such a configuration may be used in a conventional three-stage design, or as the first three compression stages in new HPGL embodiments, described below. The three stages of compression 210, 220, and 230 are described as follows.

In this example, in the first stage 210, gas enters an initial scrubber 212 through a first plumbing line 211. Liquids condensing within scrubber 212 are removed through a scrubber dump line 215. Gas leaves scrubber 212 through plumbing line 214 and enters a first stage compressor 216. Gas compressed by compressor 216 leaves through plumbing line 218 and is directed to a first cooler 219. Gas cooled by cooler 219 leaves through plumbing line 221 and enters the second scrubber 222.

In the second stage 220, liquids condensing within scrubber 222 are removed by scrubber dump line 225. Such liquids may flash vaporize upon being dumped from scrubber 222 and are therefore redirected back to first scrubber 212 as shown. Gas leaving second scrubber 222 leaves through plumbing line 224 and enters a second compressor 226. Gas compressed by compressor 226 leaves through plumbing line 228 and enters a second cooler 229. Gas cooled by cooler 229 leaves through plumbing line 231 and enters a third scrubber 232.

In the third stage 230, liquids condensing within scrubber 232 are removed by scrubber dump line 235. Such liquids may flash vaporize upon being dumped from scrubber 232 and are therefore redirected back to scrubber 212 as shown. Gas leaving scrubber 232 leaves through plumbing line 234 and enters a third compressor 236. Gas compressed by compressor 236 leaves through plumbing line 238 and enters a third cooler 239. Gas cooled by cooler 239 exits the system through plumbing line 241 and is thereby provided as third-stage compressed and cooled gas.

Figure 3:
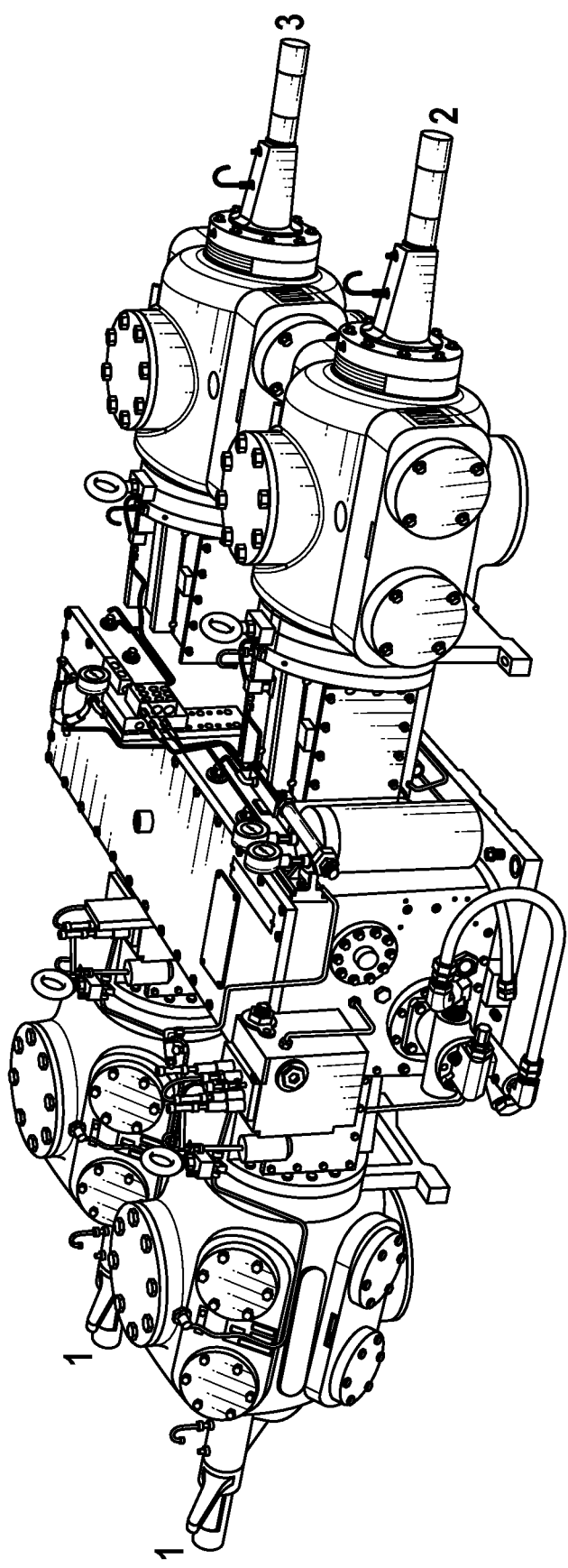
FIG. 3 illustrates a four-throw compressor that may be paired with a 350 horsepower engine, according to an embodiment.

FIG. 3 illustrates a four-throw compressor that may be paired with a 350 horsepower engine, according to an embodiment. Since most modern compressor designs are equipped with two, four, or six throws, compressor packagers must determine how to accommodate an odd number (e.g., three) of compression stages with an even number of compressor throws. The compressor of FIG. 3 may be configured to utilize the two throws on the left (each labeled "1" in FIG. 3) for the first stage. The remaining two throws (i.e., labeled "2" and "3" in FIG. 3) are used for the second and third stages respectively. Every cylinder in this example is double acting, meaning that it compresses gas when the piston rod travels in as well as when it travels out. Since horsepower is a function primarily of compression ratios and the number of molecules in the gas being compressed, and designers want to evenly distribute the amount of compression ratios per stage, the first stage cylinders consume relatively less horsepower in comparison to the second and third stages. This example demonstrates that it is possible to perform three stages of compression using a four throw machine.

Figure 4:
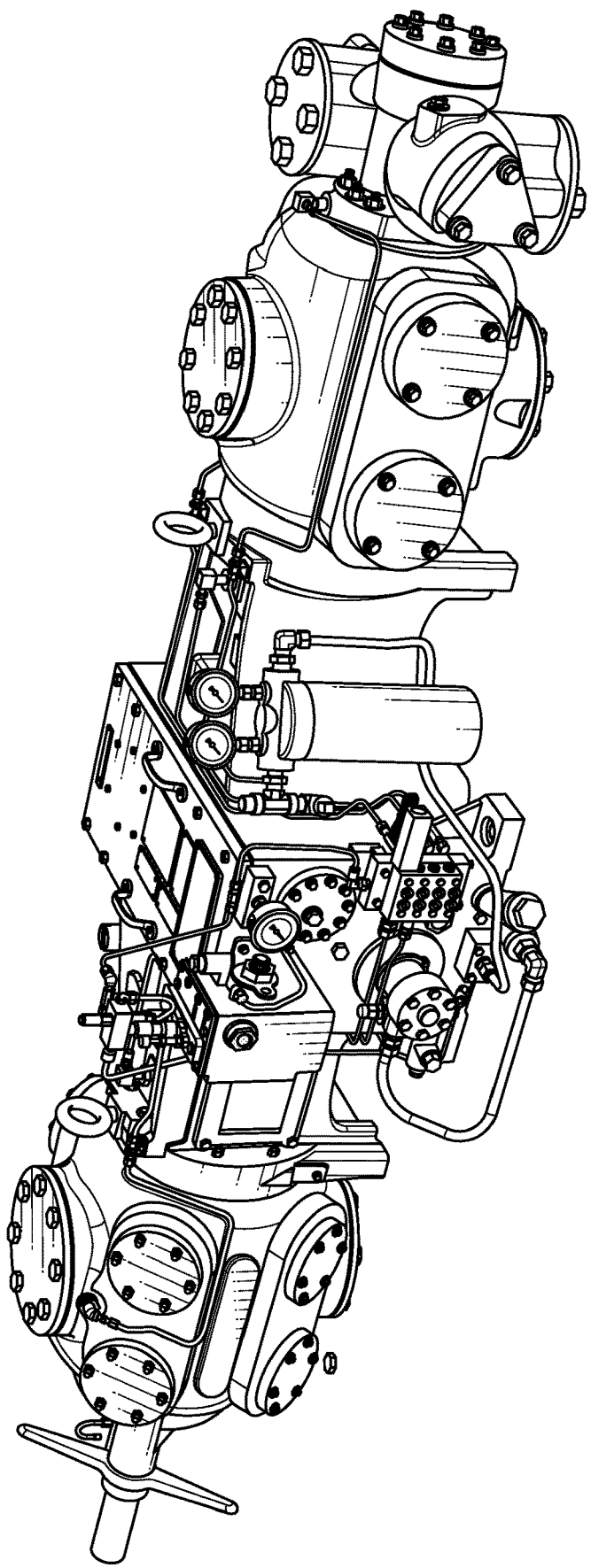
FIG. 4 illustrates a two-throw compressor that may be used for lower horsepower designs, according to an embodiment.

FIG. 4 illustrates a two-throw compressor that may be used for lower horsepower designs, according to an embodiment. In this embodiment, the throw on the right has two cylinders of different diameters sharing the same rod. These are known as tandem cylinders (e.g., see FIG. 5 and related description below). There are advantages and disadvantages to the use of tandem cylinders, but they are an important tool for the compressor packager. The point here is that a compression job requiring an odd number of compression stages may not ideally utilize a compressor frame with an even number of stages.

Figure 5:
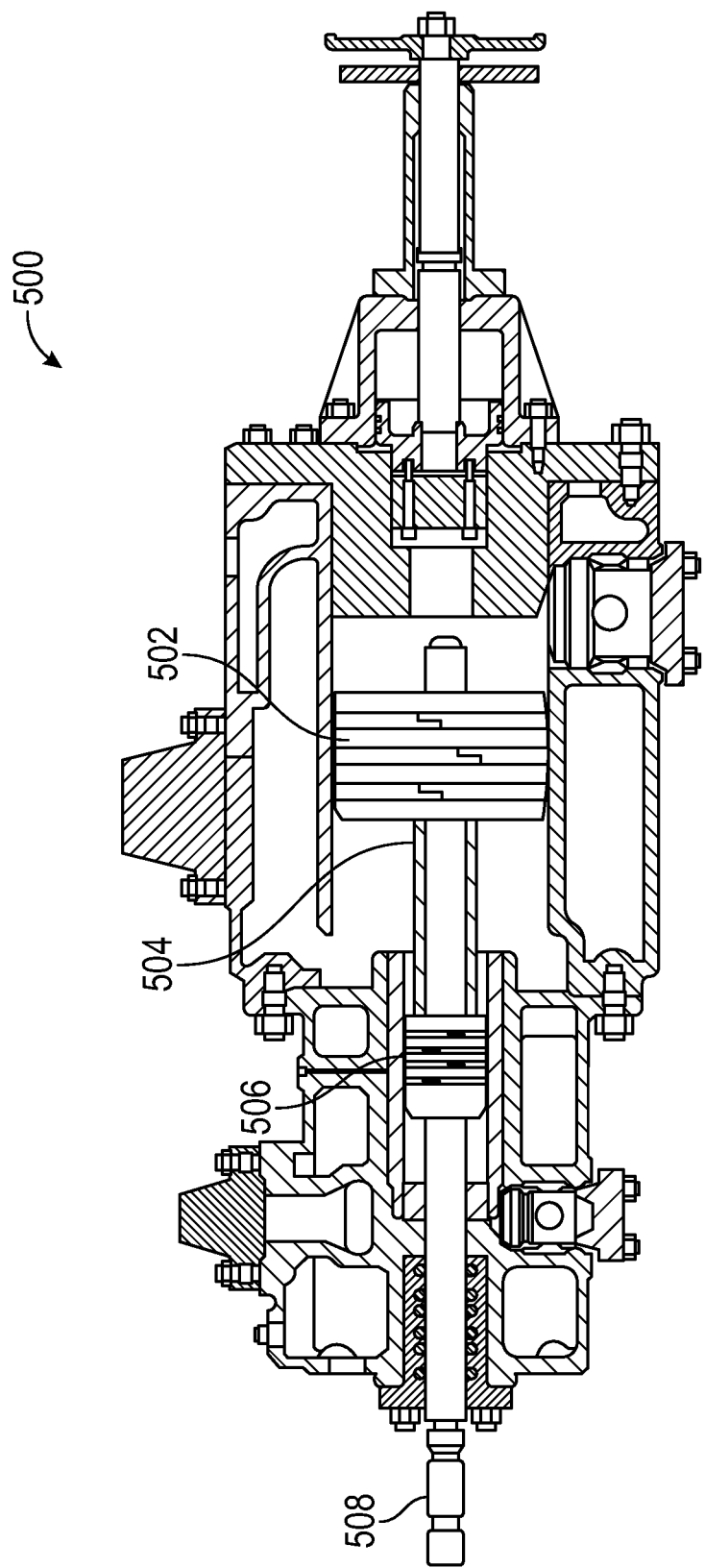
FIG. 5 illustrates a stepped cylinder having two different cylinder bores, according to an embodiment.

FIG. 5 illustrates a stepped cylinder 500 having two different cylinder bores, according to some embodiments. As shown, a stepped cylinder includes a first-stage piston 502, a spacer 504, and a second-stage piston 506. The first-stage piston 502 may have a larger diameter than the second-stage piston 506. As shown, each of the first-stage 502 and second-stage 506 pistons may be connected to a common piston rod 508 which is configured to drive both pistons at a common frequency.

Disclosed embodiments may include tandem cylinders, such as tandem cylinder 500 of FIG. 5, for single-stage or two-stage compression. Such cylinders may be used for high pressure booster compressor devices which include a reconfigurable one-stage or two-stage design. In such embodiments, once discharge pressures fall below 2700 psig, the second stage piping may be reconfigured to make the cylinders compress second stage gas in parallel with the first stage instead of being piped in series for two stage operation. Similar approaches may be used to design new HPGL devices exhibiting significant flexibility to the compressor performance.

As mentioned above, various embodiments (as described above) may further include a gas conditioning system that takes wellhead natural gas and conditions the gas to generate a fuel gas that may be used by the natural gas engine that powers the gas compressor system.

Wellhead natural gas generally is a mixture of unprocessed natural hydrocarbons of varying compositions of methane, ethane, propane, butane, pentane. This unprocessed natural gas stream is typically also saturated with water. Unprocessed gas can be problematic for use as an engine fuel for at least the following reasons. As temperatures and pressures change within the fuel gas stream, phase changes can occur, introducing undesirable liquids and hydrate precipitates, as described above with reference to FIG. 1. Liquids cannot be burned in natural gas engines and can cause engine damage if introduced into the engine combustion chamber. Further, hydrates, having a solid ice-like consistency, may also form. Such hydrates may cause blockages within the fuel gas system and may ultimately shut down the engine and compressor package. Heavy hydrocarbons that remain in gaseous phase may also be problematic to use as an engine fuel, causing engine knock or detonation. Removing condensed liquids, preventing the formation of hydrates, and reducing the content of heavy hydrocarbons is advantageous for the proper and reliable operation of the engine and compressor package.

Historically, compressor manufacturers and compressor rental/service companies have not addressed the need for suitable fuel gas and have placed the burden of supplying suitably processed fuel gas on the oil/gas production company (i.e., the end user of the compressor equipment). Oil and gas operators, however, are often inexperienced and ineffective in providing processed fuel gas. Even the best efforts to provide processed fuel gas often yield marginal results.

Some operators have attempted to address this problem with makeshift heat tracing and/or insulating efforts, which tend to be short-lived, unreliable, or simply inadequate. Others have addressed this problem by injecting chemical inhibitors (i.e., anti-freeze agents) into the fuel system. Such chemical inhibitors represent an undesirable expense and present chemical disposal challenges. Methanol, for example, is a common chemical used for this purpose. While effective, a steady and ongoing flow of methanol is required. Such methanol use represents an added operation expense. Further, methanol is a pollutant that must be separated and disposed somewhere further downstream in the system from where it is needed as an anti-freeze agent.

A further method to mitigate hydrate formation is to keep pressures and temperatures of the fuel gas stream out of a range where hydrates are known to form, as described above with reference to FIG. 1. This may be accomplished by adding heat to the fuel gas stream to increase the temperature above the hydrate formation temperature. Electrical heat tracing is often used as a source of heat. While electrical heat tracing can be effective, it requires off-skid power which is not always available. Further, use of electrical power represents an increase in the capital cost of initial installation and an increase in ongoing operating costs.

As described above, some natural gas compressor packages used in the oil/gas industry carry out a multi-stage compression process. Each stage of compression typically includes a "scrubbing" (two-phase liquid/gas separation) process, a compression, and a cooling process. Multiple stages of compression are used to reach a desired discharge pressure. Thermodynamics dictates that decreasing amounts of water and heavier hydrocarbons can exist in gas phase as the pressure of a gas increases and the temperature of the gas decreases. Thus, as the gas progresses through multiple stages of compression, the gas is effectively subjected to a cleaning process. This effect may be used to condition fuel gas for use in engines that power the compressor package. However, as the process gas pressure is relatively high after several stages of compression, the pressure must be reduced to a pressure suitable to enter the engine fuel system.

Reducing the pressure of a gas is known to cause the Joule-Thompson ("J-T") effect, which results in cooling the gas. This cooling can lead to additional water and heavy hydrocarbon condensation out of this fuel gas stream, introducing liquids and hydrate precipitates. If the only result of the J-T effect was liquid condensation, the solution to the problem would only require two-phase separation, or removal of the liquids from the gas stream. However, as described above, hydrates can also form in the gas stream as the pressure is reduced. Such hydrate formation may plug ports in regulators and in some cases may stop flow of the fuel stream completely.

Disclosed embodiments include a fuel gas conditioning system that provides a natural gas fuel supply to a natural gas compressor package, such as the compressor package illustrated and described in greater detail with reference to FIG. 8, below. The disclosed embodiments provide a cost effective on-skid fuel gas conditioning system that avoids the formation of liquids and/or hydrates and reduces the heavy hydrocarbon content of the gas, allowing the compressor package to operate reliably through changing ambient conditions. Disclosed systems and methods mitigate hydrate formation in the compressor fuel gas system by maintaining the temperature of the fuel gas stream above the hydrate formation temperature. Instead of using off-skid heat sources, however, disclosed embodiments utilize an on-skid heat source (i.e., heat proved by engine coolant), eliminating dependence on power sources that either may not be present, or would increase the expense of operating the equipment.

Disclosed embodiments include systems and methods that perform operations including.

- Taking a side stream of high pressure gas from the output of a single-stage compressor or from the last compression stage of a multi-stage gas compressor. The side stream is taken after passing through a scrubber on the final compression stage. As such, the side stream has been conditioned to be free of most liquids and hydrates.
- Heating the side stream of gas by a heat exchanger using heat from the gas engine coolant.
- Sending the heated gas through a pressure reducing valve to lower the pressure to a value suitable for use of the gas as input fuel to the gas engine. The heat provided to the high pressure gas avoids precipitation of hydrates as the pressure is reduced (and consequently temperature is lowered due to the Joule-Thomson effect).
- Feeding the conditioned lower pressure gas to the gas engine as fuel.

This system conditions the fuel gas such that the heating value (e.g., expressed in British thermal units per standard cubic feet: BTU/scf) is lowered, water and hydrocarbon liquids are removed, and hydrate formation is prevented. These processes provide a conditioned fuel gas that ensures reliability of the compressor package operation. Disclosed systems include pressure reducing valves, filters, and heat exchangers, as described in greater detail below.

Figure 6:
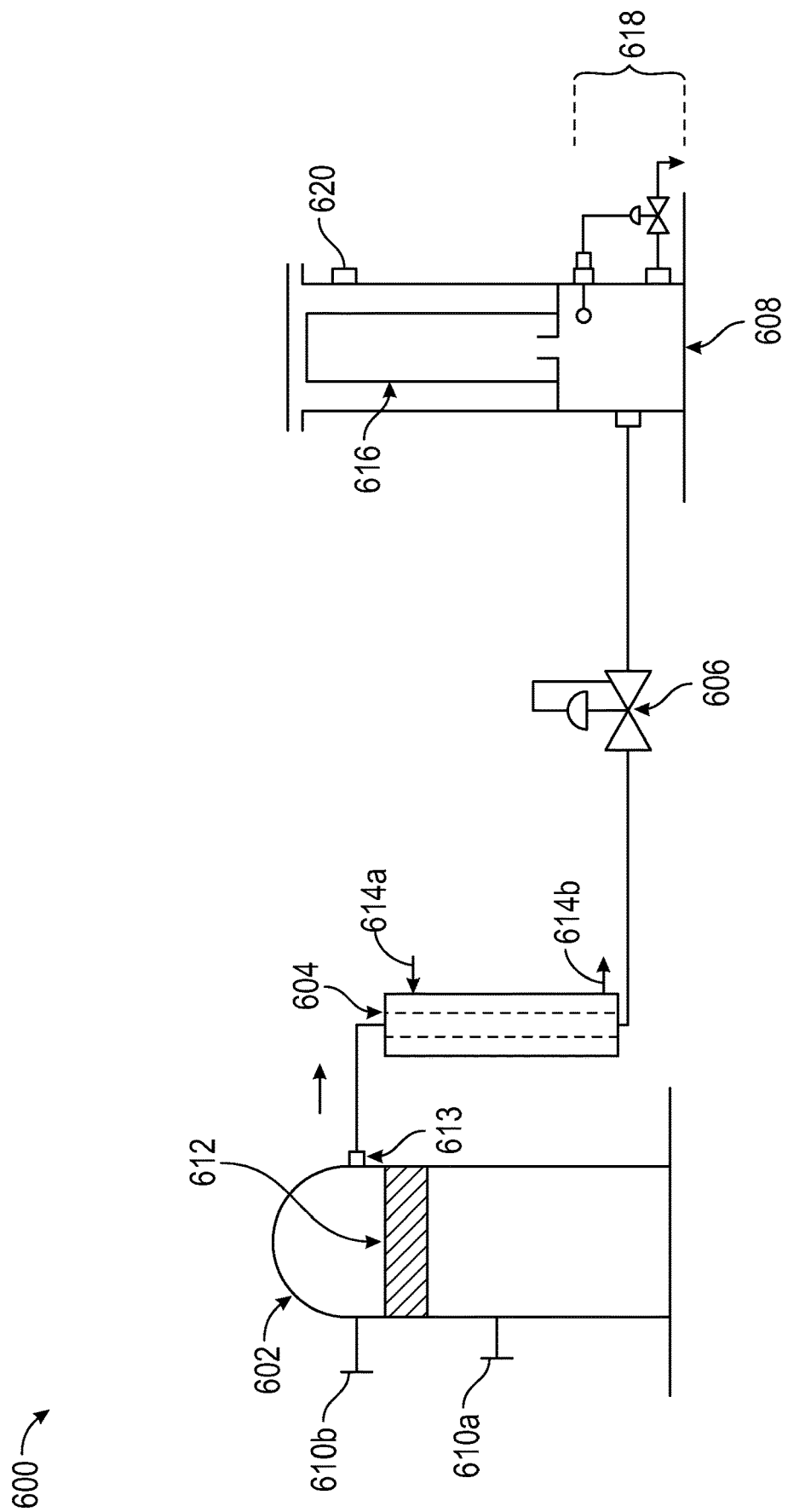
FIG. 6 illustrates components of a fuel gas conditioning system, according to an embodiment.

FIG. 6 illustrates components of a fuel gas conditioning system 600, according to an embodiment. System 600 includes a scrubber 602, a heat exchanger 604, a pressure reducing valve 606, and a pressure vessel 608. In example embodiments, a Fisher Series 627 pressure reducing valve may be used as pressure reducing valve 606 and a Parker Series 89 vertical gas coalescing vessel may be used as pressure vessel 608. Scrubber 602 includes a process gas inlet 610*a* and a process gas outlet 610*b*. Scrubber 602 further includes a mist extraction device 612, which acts to remove mist and entrained liquids from a process gas stream that flows between inlet 610*a* and outlet 610*b*. Scrubber 602 further includes a tap 613 that is configured to remove a side stream of gas downstream of mist extraction device 612. Gas flowing through tap 613 is fed to heat exchanger 604 before being fed to pressure reducing valve 606.

Heat exchanger 604 includes an engine coolant inlet 614*a* and an engine coolant outlet 614*b*. Coolant from the engine flowing into inlet 614*a*, through a first channel of the heat exchanger, and out of outlet 614*b* provides heat to heat exchanger 604. Gas flowing through a second channel of heat exchanger 604 absorbs heat provided by the engine coolant. The heat added to the gas stream by heat exchanger 604 is sufficient to avoid generation of condensates due to reduction of pressure (and temperature due to the J-T effect) upon passing through pressure reducing valve 606. Preheating the gas raises the gas temperature above the condensation and hydrate formation temperature even after it is cooled by the J-T effect as it passes through pressure reducing valve 606.

Depending upon the pressure of the source gas, one or more additional stages of preheating and pressure reduction may be required to achieve a reduced pressure suitable for use of the processed gas as fuel. Regardless of the number of stages of preheating and pressure reduction, after the fuel gas stream exits the final pressure reducing valve 606, the gas is fed to pressure vessel 608. Pressure vessel 608 includes a coalescing type filter element 616, which removes any liquids from the gas which may have condensed in the gas stream during the pressure reduction. In example embodiments, a Parker NGGC series gas coalescing filter element may be used as coalescing type filter element 616. Pressure vessel 608 further includes a liquid level control system 618 that drains liquid that is collected in pressure vessel 608. The conditioned gas is provided through outlet 620 which is connected to a fuel gas input of a gas engine (not shown). The resulting conditioned gas is suitable for use as fuel for the gas engine that drives the multi-stage compressor. The fuel gas stream provided by the gas outlet 620 is conditioned such that no liquids are present and conditions for hydrate formation are avoided.

FIG. 7A illustrates an example of heat exchanger 604 of FIG. 6, according to an embodiment. Heat exchanger 604 includes a wire matrix heat transfer element 722 as shown in FIG. 7C. In example embodiments, a Calgavin hiTRAN® wire matrix heat transfer element may be used as heat transfer element 722. FIG. 7B illustrates a cross-sectional view of heat exchanger 604 of FIG. 7A, according to an embodiment. In this example, heat exchanger 604 includes two pipes 724*a* and 724*b* (see FIG. 7A). Pipe 724*a* fits concentrically within pipe 724*b*. An annular space between pipes 724*a* and 724*b* is sealed with an annular (i.e., donut-shaped) piece of plate steel 726. Pipe 724*b* acts as a shell around pipe 724*a*, and includes threaded connections 728 that allow coolant from the gas engine (e.g., engine jacket water) to be circulated in the annular space between pipes 724*a* and 724*b*. Heat exchanger 604 is configured such that as gas flows through pipe 724*a* it absorbs heat provided by the engine coolant that flows in the annular space between pipes 724*a* and 724*b*. Wire matrix heat transfer element 722 is placed inside tube 724*a* to increase heat transfer efficiency such that an overly long heat exchanger is not required.

Figure 8A:
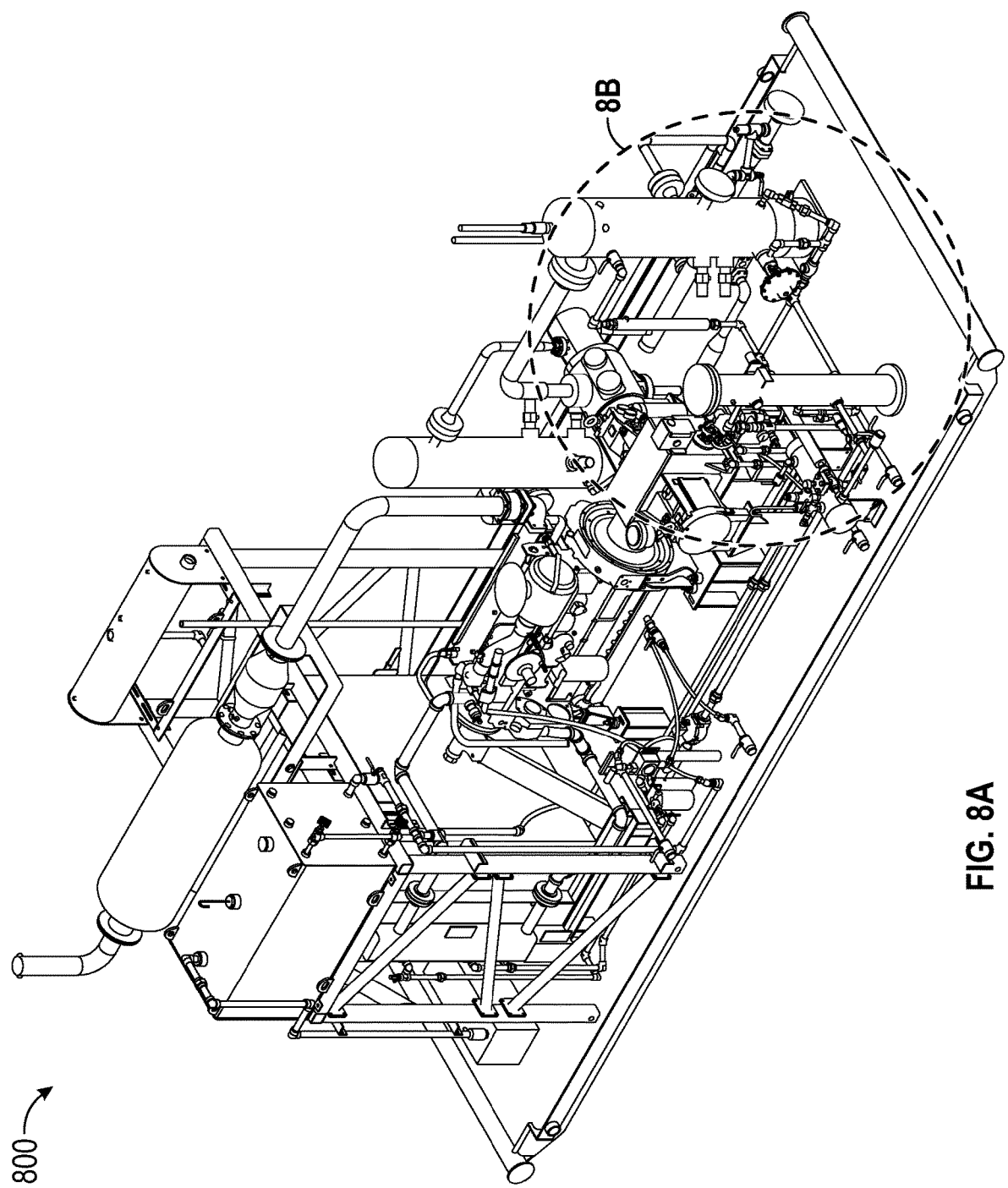
FIG. 8A illustrates a gas compressor package including a gas conditioning system, according to an embodiment.

FIG. 8A illustrates a gas compressor package 800 including a gas conditioning system (shown in greater detail in FIG. 8B), according to an embodiment. Compressor package 800 is powered by a natural gas engine and is an example of a compressor system that may be used in the oil/gas industry to generate pressurized gas required for gas lift applications. As described above, gas conditioning system 802 takes wellhead natural gas and conditions the gas to generate a fuel gas that may be used by the natural gas engine that powers gas compressor system 802.

Figure 8B:
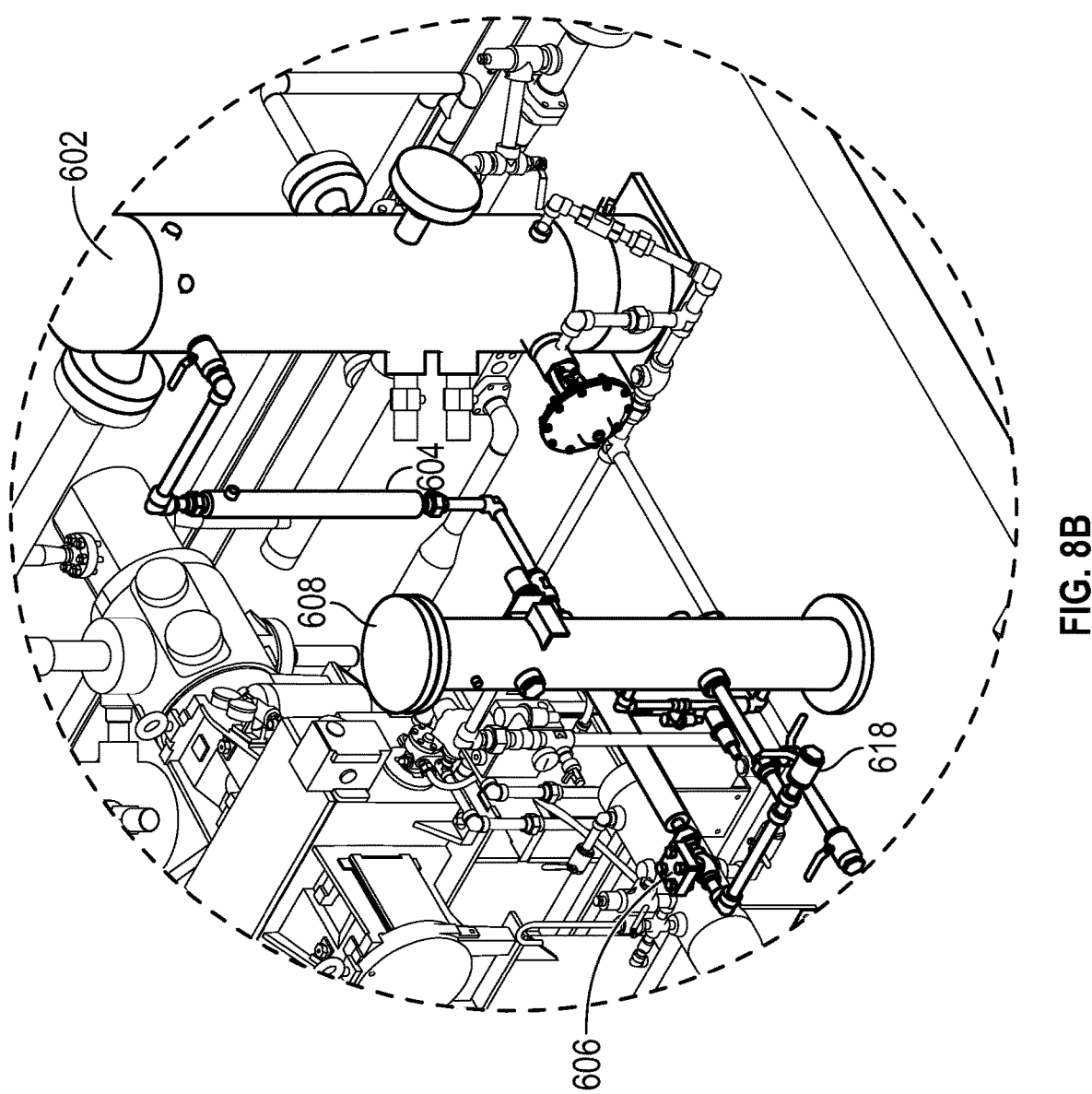
FIG. 8B illustrates an expanded view of a region of the a gas compressor package of FIG. 8A showing components of the a gas conditioning system, according to an embodiment.

FIG. 8B illustrates an expanded view of a region of the a gas compressor package of FIG. 8A showing components of the a gas conditioning system, according to an embodiment. As shown, the gas conditioning system includes a scrubber 602, a heat exchanger 604, a pressure reducing valve 606, and a pressure vessel 608. Pressure vessel 608 further includes a liquid level control system 618 that drains liquid that is collected in pressure vessel 608. These components are described in greater detail above with reference to FIGS. 6 to 7C.

Conditional language, such as, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The specification and annexed drawings disclose examples of multi-stage gas compressors and fuel gas conditioning systems and methods. The examples illustrate various features of the disclosure, but those of ordinary skill in the art may recognize that many further combinations and permutations of the disclosed features are possible. Accordingly, various modifications may be made to the disclosure without departing from the scope or spirit thereof. Further, other embodiments of the disclosure may be apparent from consideration of the specification and annexed drawings, and practice of disclosed embodiments as presented herein. Examples put forward in the specification and annexed drawings should be considered, in all respects, as illustrative and not limiting. Although specific terms are employed herein, they are used in a generic and descriptive sense only, and not used for purposes of limitation.

What is claimed is:

1. A system configured to condition a fuel gas for a gas engine of a gas compressor, the system comprising:
    a scrubber of the gas compressor, the scrubber having a process gas inlet, a process gas outlet, a mist extraction device, and a tap, the scrubber configured to remove moisture from the process gas as the process gas flows from the gas inlet, through the mist extraction device, to the gas outlet, and the tap configured to allow a stream of gas to be removed from the scrubber downstream from the mist extraction device;
    a heat exchanger having a gas inlet connected to the tap of the scrubber, a gas outlet, an engine coolant inlet, and an engine coolant outlet, the heat exchanger configured to allow coolant to flow through the heat exchanger from the engine coolant inlet to the engine coolant outlet, and to allow gas to flow through the heat exchanger from the gas inlet to the gas outlet such that heat is transferred from the engine coolant to the gas;
    a pressure reducing valve having a valve inlet, connected to the gas outlet of the heat exchanger, and a valve outlet, the pressure reducing valve configured to reduce a pressure of the gas flowing through the pressure reducing valve from the valve inlet to the valve outlet; and
    a pressure vessel having a gas inlet, connected to the valve outlet of the pressure reducing valve, a coalescing type filter element, a gas outlet, and a liquid outlet, the pressure vessel configured to receive gas from the pressure reducing valve, to remove liquids from the gas via the coalescing type filter element, to allow liquid to be removed from the pressure vessel via the liquid outlet, and to provide conditioned fuel gas to the gas engine of the gas compressor via the gas outlet.

2. The system of claim 1, wherein the heat exchanger further comprises:
    a first pipe configured to allow gas to flow from the gas inlet to the gas outlet through the first pipe;
    a second pipe concentrically surrounding the first pipe to thereby form a annular space between the first and second pipes, wherein ends of the second pipe are sealed,
    wherein the engine coolant inlet and outlet are fluidic channels formed in the second pipe, the fluidic channels configured to allow coolant to flow through the annular space from the coolant inlet to the coolant outlet.

3. The system of claim 2, wherein the engine coolant inlet and outlet include threaded connectors configured to make respective threaded connections with engine coolant input and output fluidic conduits.

4. The system of claim 1, wherein the heat exchanger further comprises:
    a wire matrix heat transfer element positioned within a first pipe,
    wherein the wire matrix heat transfer element is configured to increase efficiency of heat transfer from the engine coolant to the gas flowing through the heat exchanger from the gas inlet.

5. The system of claim 1, wherein the heat exchanger is configured to provide sufficient heat to the gas so that conditions for hydrate formation are avoided when the pressure is reduced by the pressure reducing valve.

6. The system of claim 1, wherein the pressure vessel further comprises a pneumatic float switch configured to drain liquid that is collected in the pressure vessel.

7. The system of claim 1, further comprising one or more additional heat exchangers and one or more corresponding additional pressure reducing valves, the one or more additional heat exchangers and one or more additional pressure reducing valves configured to provide one or more additional stages of preheating and pressure reduction.

8. The system of claim 1, wherein the gas compressor is a multi-stage compressor and the scrubber is a component of a final stage of compression of the multi-stage compressor.

9. The system of claim 1, wherein the gas outlet of the pressure vessel is connected to the gas engine of the gas compressor such that conditioned fuel gas from the pressure vessel is provided to the gas engine of the gas compressor.

10. The system of claim 1, wherein the conditioned fuel gas provided by the outlet of the pressure vessel has reduced water content, reduced hydrocarbon liquid content, and a reduced heating value, relative to wellhead natural gas that is input to the gas compressor.

11. A method of conditioning a fuel gas for a gas engine of a gas compressor, the method comprising:
    causing a stream of gas to flow from a scrubber of the gas compressor to a heat exchanger, the gas being taken downstream from a mist extraction device of the scrubber;
    causing engine coolant to flow through a first channel of the heat exchanger as gas flows through a second channel of the heat exchanger such that heat is transferred from the engine coolant to the gas, thereby heating the gas;

causing the gas to flow from the heat exchanger through a pressure reducing valve to thereby reduce a pressure of the gas;

causing the gas to flow from the pressure reducing valve to a pressure vessel having a a coalescing filter element;

removing liquid from the gas via the coalescing filter element of the pressure vessel to thereby generate conditioned fuel gas; and providing the conditioned fuel gas from the pressure vessel to the engine of the gas compressor.

12. The method of claim 11, wherein the heat exchanger comprises:

a first pipe configured to allow gas to flow from the gas inlet to the gas outlet through the first pipe;

a second pipe concentrically surrounding the first pipe to thereby form an annular space between the first and second pipes, wherein ends of the second pipe are sealed, wherein the heat exchanger includes an engine coolant inlet and an engine coolant outlet that are fluidic channels formed in the second pipe, the method further comprising:

allowing coolant to flow through the annular space from the coolant inlet to the coolant outlet.

13. The method of claim 12, wherein the engine coolant inlet and an engine coolant outlet each include threaded connectors configured to make respective threaded connections with engine coolant input and output fluidic conduits, the method further comprising:

allowing coolant to flow from the engine to the heat exchanger through a first fluidic conduit that is connected to the engine coolant inlet, and allowing coolant to flow from the heat exchanger back to the engine through a second fluidic conduit that is connected to the engine coolant outlet.

14. The method of claim 12, wherein the heat exchanger further comprises:

a wire matrix heat transfer element positioned within the first pipe, wherein the wire matrix heat transfer element is configured to increase efficiency of heat transfer from the engine coolant to the gas, the method further comprising:

allowing gas to flow through the heat exchanger such that the gas makes contact with the wire matrix heat transfer element such that the gas thereby absorbs heat from the wire matrix heat transfer element.

15. The method of claim 11, further comprising:

providing, via the heat exchanger, sufficient heat to the gas so that conditions for hydrate formation are avoided when the pressure is reduced by the pressure reducing valve.

16. The method of claim 11, wherein the pressure vessel further comprises a pneumatic float switch, the method further comprising:

draining, via the pneumatic float switch, liquid that is collected in the pressure vessel.

17. The method of claim 11, further comprising:

causing the gas to flow through one or more additional heat exchangers and one or more corresponding additional pressure reducing valves, to thereby provide respective one or more additional stages of heating and pressure reduction.

18. The method of claim 11, wherein the gas compressor is a multi-stage gas compressor and the scrubber is a component of a final stage of compression of the multi-stage compressor.

19. The method of claim 11, wherein the pressure vessel includes a gas outlet that is connected to the gas engine of the gas compressor, the method further comprising:

providing the conditioned fuel gas from the pressure vessel to the engine of the gas compressor via the gas outlet of the pressure vessel.

20. The method of claim 11, wherein the conditioned fuel gas provided by the pressure vessel to the engine has reduced water content, reduced hydrocarbon liquid content, and a reduced heating value, relative to wellhead natural gas that is input to the gas compressor.

* * * * *